Figure 1:
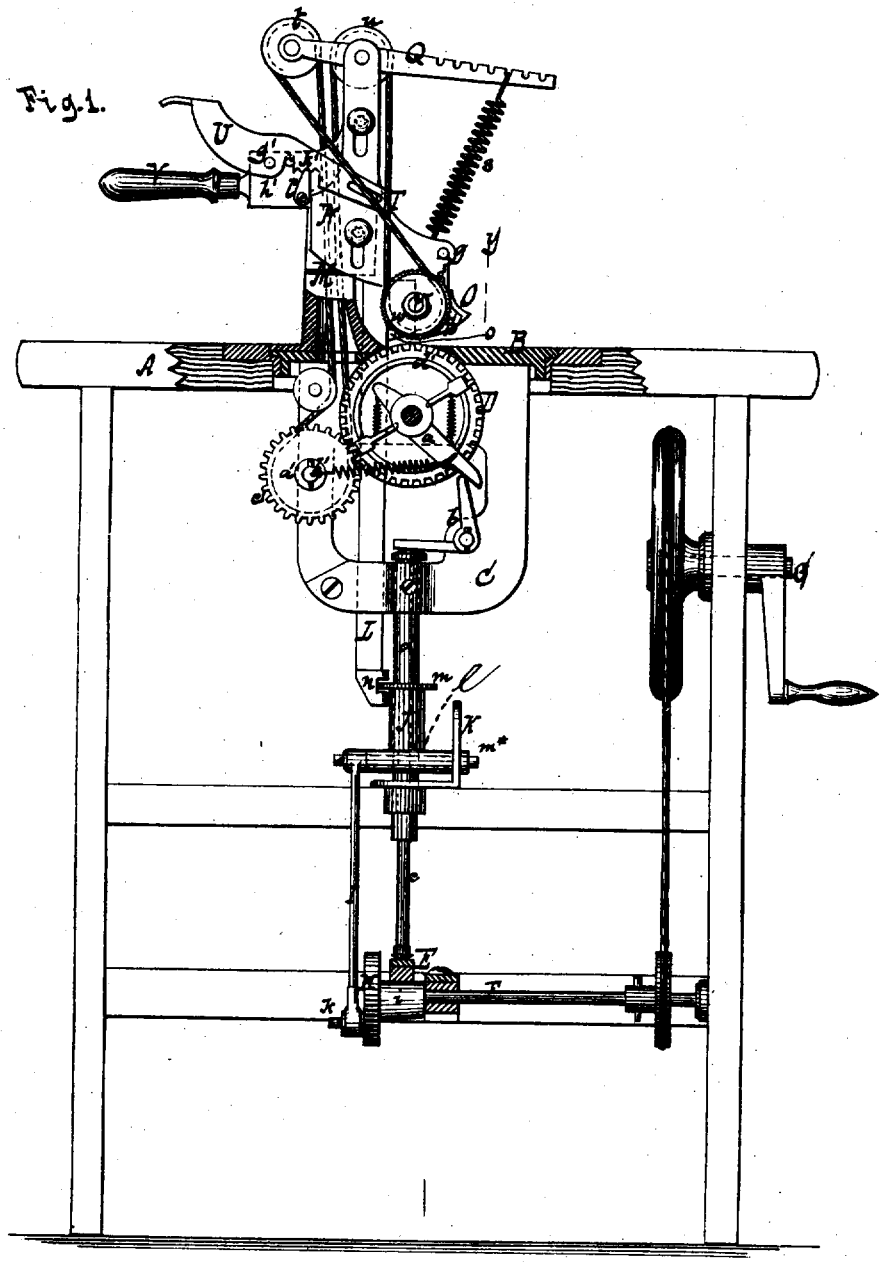

2 Sheets—Sheet 1.

A. WARTH.

Machine for Cutting Textile Fabrics.

No. 9,231. Reissued June 1, 1880.

Witnesses:
Otto Hufeland
William Miller

Inventor.
Albin Warth
by Van Santvoord & Hauff
his attorneys.

A. WARTH.
Machine for Cutting Textile Fabrics.
No. 9,231. Reissued June 1, 1880.
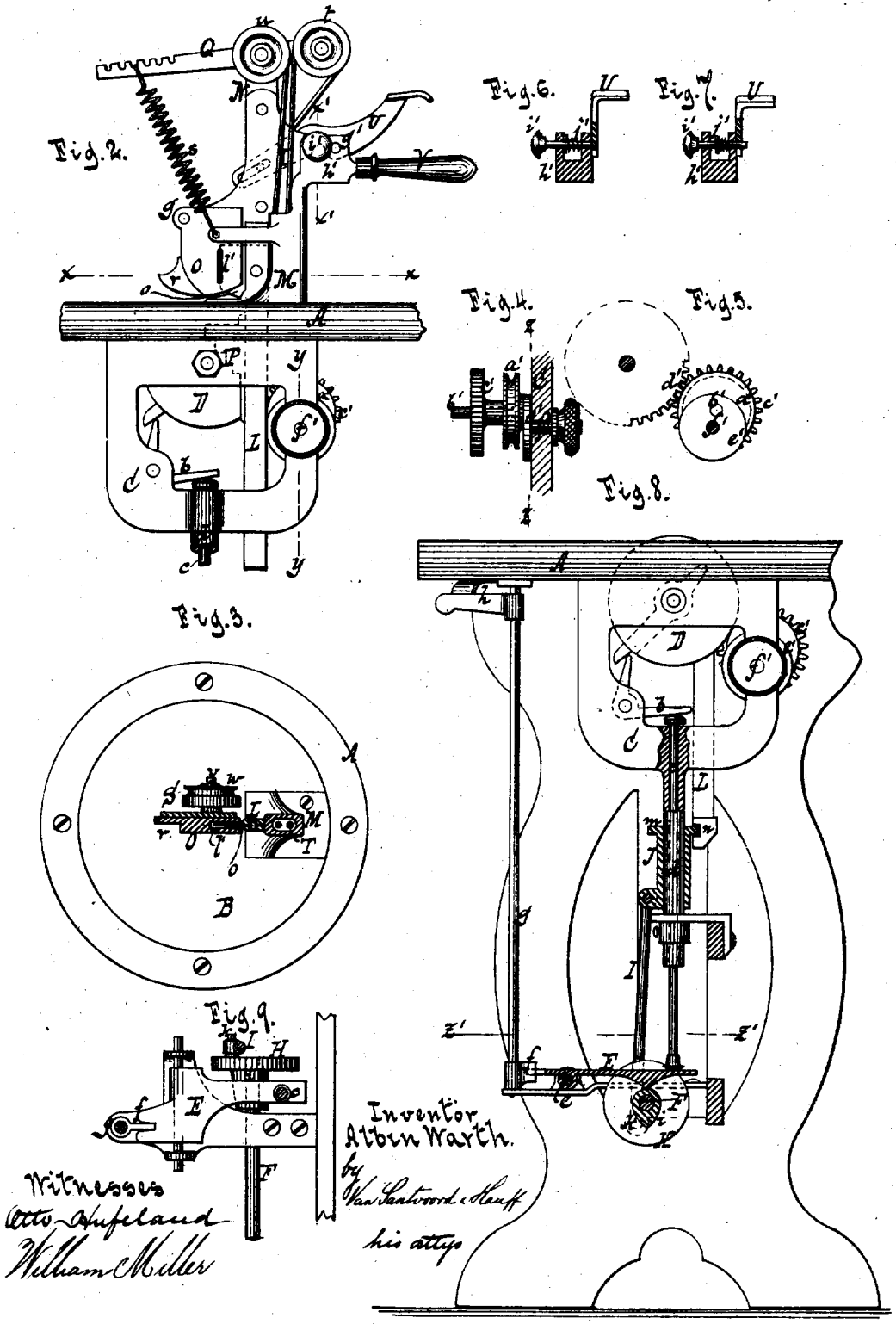

UNITED STATES PATENT OFFICE.

ALBIN WARTH, OF STAPLETON, NEW YORK.

MACHINE FOR CUTTING TEXTILE FABRICS.

SPECIFICATION forming part of Reissued Letters Patent No. 9,231, dated June 1, 1880.

Original No. 124,180, dated February 27, 1872. Application for reissue filed February 25, 1880.

*To all whom it may concern:*

Be it known that I, ALBIN WARTH, a citizen of the United States, residing at Stapleton, in the county of Richmond and State of New York, have invented a new and useful Improvement in Machines for Cutting Textile and other Materials, which improvement is fully set forth in the following specification, reference being had to the accompanying drawings, in which—

Figure 1 represents a sectional side view, showing one side of the cutting mechanism. Fig. 2 is a similar view, showing the other side of the cutting mechanism. Fig. 3 is a horizontal section in the plane *x x*, Fig. 2. Fig. 4 is a detached section of the eccentric-bearing of the cog wheel which forms part of the feed mechanism, the plane of the section being indicated by the line *y y*, Fig. 2. Fig. 5 is a sectional front view of the same in the plane *z z*, Fig. 4. Fig. 6 is a transverse section of the spring-stop for the presser-slide in the plane *x' x'*, Fig. 2, when said spring-stop is thrown back. Fig. 7 is a similar section of the same when the spring-stop is thrown forward. Fig. 8 is a transverse section of the lower portion of my machine in the plane *y' y'*, Fig. 1. Fig. 9 is a horizontal section of the same in the plane *z' z'*, Fig. 8.

Similar letters indicate corresponding parts.

This invention relates to certain improvements on that class of machines for cutting textile and other materials on which a patent was granted to me August 2, 1870, No. 106,101.

These improvements consist in certain mechanism for controlling the position of the presser-slide; also, in a knife-protector, which is carried by the platform supporting the material to be cut, and which is also provided with an index to indicate the course and position of the knife; also, in a graduated stop for regulating the distance between the upper and lower feed-wheels; also, in an eccentric-pin, forming the bearing for the pinions, which engages with the feed-wheel; also, in peculiar mechanism for transmitting motion to the knife; also, in certain peculiar means for adjusting the feed motion, all as hereinafter more fully explained.

In the drawings, the letter A designates a table, which is provided with a circular cavity to receive the platform or plate B, which supports the material near the place where it is to be cut, and which carries the working parts of my machine. From the lower surface of this platform extends a bracket, C, which forms the bearings for the axle of the feed-wheel D and for the parts connected with or acting on said feed-wheel. The feed-wheel is driven by a dog, *a*, which turns freely on the shaft that carries the feed-wheel, and which is acted upon by a bell-crank lever, *b*, to which the required motion is imparted by a tappet-rod, *c*.

From the bottom end of the bracket C extends a hollow rod, *d*, which is secured at its lower end to the frame of the table A, and through this hollow rod extends the tappet-rod *c*, the foot of which rests upon a lever, E. (Best seen in Figs. 8 and 9.) This lever slides on its fulcrum-pin *e*, and its outer end is bifurcated and made to straddle an arm, *f*, which is mounted on a vertical rock-shaft, *g*, to which an oscillating motion can be imparted by a handle, *h*. (See Fig. 8.) By turning this handle the lever E is caused to slide on its fulcrum-pin.

The bottom edge of the lever E is cam-shaped, (see Fig. 8,) and it bears on a tapering cam, *i*, (see Figs. 1, 8, and 9,) mounted on a shaft, F, which receives a revolving motion from the driving-shaft G. As the shaft F revolves, the cam *i* imparts to the lever E and to the tappet-rod *c* a rising-and-falling motion, whereby the feed-wheel is actuated and the amount of motion is regulated by moving the lever E toward the thick or toward the thin end of the tapering cam *i*.

On the end of the shaft F is mounted a disk, H, which carries an eccentric wrist-pin, *k*, that connects by a pitman-rod, I, with a sleeve, J, moving up and down on the hollow rod *d*, extending from the bracket C. To prevent this sleeve from turning round it is provided with an arm, *l*, which engages with a slotted bracket, K, secured to the frame of the table, (see Fig. 1,) said arm being protected by a friction-roller, *m**, so as to reduce the friction between it and the slotted bracket. The sleeve J terminates in a circular flange, *m*, which engages with a slot, *n*, in the lower end of the cutter-bar L, so that the rising-and-falling motion imparted to said sleeve is transmitted to the cutter-bar, and at the same time the cutter-bar can be swiveled all round the sleeve J without being thrown out of gear with its driving-flange. Said cutter-bar extends up through a guide-slot provided for it in the lower bar of the bracket C, and through another guide-slot in the platform B, and it carries the cutting instrument or knife *o*, which is secured to it by means of a screw, or in any other desirable manner. From the platform B rises a column or standard, M, (see Figs. 1, 2, and 3,) against which the back of the cutter-bar rests, and to one side of this column is secured the presser-slide N, (see Fig. 1,) the outer end of which forms the bearing for a pivot, *g*, supporting the protector O. When this protector is turned down to the position shown in Figs. 2 and 3 it covers the knife, and it prevents persons from bringing their fingers in unpleasant contact with said knife; but when the protector is turned up free access can be had to the knife.

It will be noticed that both the knife and the protector are carried by the platform B, so that in turning said platform during the operation of cutting the protector and knife preserve their relative position toward each other; and in order to obtain a support for the protector it is necessary to provide a column or standard, which rises from the platform and follows the cutting-instrument through the cut in the material. The protector also prevents the material, while being cut, from being raised by the action of the knife, so that in cutting through a pile composed of a number of layers of cloth or other material the proper position of the several layers is not disturbed during the operation of cutting. The outer end of the protector is provided with an offset, *r*, (see Figs. 2 and 3,) so that the face of said outer end is brought in line with the cutting-edge of the knife, (see Fig. 3,) and consequently the protector forms a guide by which the direction in which the knife cuts can be observed and controlled.

On the protector is provided an index, *l'*, (see Fig. 2,) to enable the workman to observe the end of the knife and to cut precisely to a certain point. Said index may consist of a slot, as shown, or it may be an index-hand or line marked on the protector.

On the cutter-bar, below the knife, is secured a serrated clearer, P, (see Fig. 2,) to prevent the socket in which the knife works from becoming choked with fibers and threads disengaged from the fabric during the operation of cutting.

The presser-slide N is depressed by the action of a spring, *s*, one end of which is hitched to an arm projecting from the column M, while its other end is attached to a lever, Q, which has its fulcrum in the top of the presser-slide, and which extends beyond its fulcrum and carries a pulley, *t*, while to the other end of the presser-slide is secured another pulley, *u*.

On the lower end of the presser-slide is secured a pivot, *v*, which forms the bearing for the upper feed-wheel, S, on the side of which is formed a grooved pulley, *w*, to receive a belt, T, which is crossed, (see Fig. 1,) one strand passing over the pulley *u* and the other over the pulley *t*, whence both strands descend through a hole provided for this purpose in the column M, (see Figs. 1 and 3,) and beneath the platform B said belt embraces a pulley, *a'*, mounted on a pin, *b'*, (see Figs. 4 and 5,) which is secured on the bracket C, and on which is also mounted a pinion, *c'*, that is rigidly connected to the pulley *a'*, and engages with a cog-wheel, *d'*, secured to the side of the lower feed-wheel, D. By means of the belt T, therefore, the motion of the lower feed-wheel is transmitted to the upper feed-wheel, and the two feed-wheels act on the fabric to be cut in the same manner as drawing-rollers, so that I am enabled to make the working-faces of one or both feed-wheels smooth without reducing their effect.

In practice, I prefer to make the face of the lower feed-wheel smooth, and to change that of the upper feed-wheel according to the nature of the material to be cut; and in order to keep the working-surface of the lower feed-wheel smooth, I am obliged to form on its side the cog-wheel *d'*, for the purpose of transmitting its motion to the upper feed-wheel, as previously described.

The connection between the pin *b'* and the bracket C (see Fig. 4) is not direct, but said pin is secured eccentrically in a disk, *e'*, (see Fig. 5,) which is mounted on a clamping-screw, *f'*, passing through the bracket C. By releasing this disk and turning it around the pinion *c'* can be adjusted to engage properly with the cog-wheel *d'* on the feed-wheel D, and since the feed-wheel has to be adjusted up or down, according to the material to be cut, the adjustment of the pinion *c'* is indispensable.

By means of the lever Q and pulley *t* the spring *s*, which acts on the presser-slide, also serves to keep the belt T taut, and by the peculiar disposition of the pulleys *w*, *u*, and *t* the presser-slide can be moved up or down without affecting the tension of the belt T.

The lever Q is provided with a series of notches, so that the action of the spring on the tension of the belt can be regulated by moving the spring *s* closer to or farther from the fulcrum of said lever.

The presser-slide is raised against the action of its spring by means of a lifter, U, which has its fulcrum on a pivot, *g'*, secured in an arm, *h'*, extending from the column M, and which extends over the handle V, that serves to rotate the platform B, so that said lifter can be operated conveniently with same hand which holds the handle V. Through the arm *h'* extends the stop *i'*, (see Figs. 6 and 7,) and said arm is recessed to make room for a spring, *j'*, which has a tendency to drive the stop back to the position shown in Fig. 6.

When the lifter is depressed so as to raise the presser-slide, the stop $i'$ can be readily forced in, so as to catch beneath the lifter, and if the lifter is permitted to bear down upon the stop the spring $s$ of the presser-slide retains said stop against the action of its spring $j'$. (See Fig. 7.) By slightly depressing the rear end of the lifter the spring-stop $i'$ is released, and allowed to recede to the position shown in Fig. 6, and the presser-slide can be lowered with one hand and without requiring the aid of the other hand for the purpose of withdrawing the stop.

In the lifter is a notch, $k'$, (see Fig. 1,) which, when the presser-slide is allowed to descend, catches over a knife-edged rest, $l'$, whereby the teeth of the upper feed-wheel are preserved against injury from striking against the face of the lower feed-wheel.

The notch $k'$ is stair-shaped, and the rest $l'$ can be adjusted so as to engage with either of the steps of the notch and to retain the upper feed-wheel at a greater or smaller elevation above the lower feed-wheel, according to the thickness of the pile or layer of cloth or other material to be cut. The knife is also sharpened on its front edge, so that it passes easily up and down through the material to be cut.

What I claim as new, and desire to secure by Letters Patent, is—

1. The spring-stop $i'$, in combination with the lifter U of the presser-slide, and with the handle V, which serves to operate the platform B, substantially in the manner set forth.

2. The combination, in a machine for cutting textile and other materials, of a platform or plate which supports the material near the place where it is to be cut, and which is movable beneath said material, a cutting-instrument which is carried by said platform or plate and is situated at a right angle toward the surface supporting said material, mechanism for imparting motion to the cutting-instrument, a column or standard rising from said platform or plate and following the cutting-instrument through the cut in the material, and a knife-protector carried by said column or standard, substantially as and for the purpose described.

3. The protector O, provided with an index slot or point to indicate the position and course of the knife, substantially as described.

4. The rest $l'$ and stair-shaped notch $k'$, in combination with the lifter U and feed-wheels D S, substantially as set forth.

5. The eccentric-pin $b'$, disk $e'$, and screw $f'$, in combination with pinion $c'$, cog-wheel $d'$, and feed-wheel D, substantially as described.

6. The tappet-rod $c$, passing through the hollow guide-rod $d$, extending from the bracket C, in combination with the lever E, cam $i$, bell-crank $b$, dog $a$, and feed-wheel D, substantially as set forth.

7. The lever E, having a transverse motion on its pivot $e$, in combination with the tapering cam $i$, tappet-rod $c$, bell-crank $b$, dog $a$, and feed-wheel D, substantially as described.

8. The sleeve J, provided with a circular flange and connected to the eccentric-pin $k$ by pitman I, in combination with the notched cutter-bar L, substantially as described.

In testimony that I claim the foregoing I have hereunto set my hand and seal this 24th day of February, 1880.

ALBIN WARTH. [L. S.]

Witnesses:
W. HAUFF,
E. F. KASTENHUBER.